(12) United States Patent
Doherty et al.

(10) Patent No.: US 10,831,998 B2
(45) Date of Patent: Nov. 10, 2020

(54) VISUALIZING SENTIMENT ON AN INPUT DEVICE

(71) Applicant: International Business Machines Corporation, Armonk, NY (US)

(72) Inventors: Jessica Doherty, Poughkeepsie, NY (US); Heidi Lagares-Greenblatt, Jefferson Hills, PA (US); Justin McCoy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 83 days.

(21) Appl. No.: 16/225,313

(22) Filed: Dec. 19, 2018

(65) Prior Publication Data

US 2020/0201939 A1    Jun. 25, 2020

(51) Int. Cl.
G06F 40/289    (2020.01)
G06N 5/04    (2006.01)
G06F 40/30    (2020.01)

(52) U.S. Cl.
CPC ............ *G06F 40/289* (2020.01); *G06F 40/30* (2020.01); *G06N 5/04* (2013.01)

(58) Field of Classification Search
CPC ........ G06F 3/0488; G06F 16/00; G06F 17/27; G06F 17/30; G06F 40/289; G06F 40/30; G06F 3/014; G06F 3/023; G06F 3/04817; G06F 3/0484; G06F 3/04842; G06F 16/335; G06F 16/954; G06F 40/166; G06F 40/284; G06Q 30/02; G06Q 30/0261; G06Q 30/0269; G06N 5/04; G06N 99/00; H04L 12/58; H04L 51/063; H04L 67/20; G10L 15/1815; G06T 11/206

USPC ........ 455/419; 704/2, 9, 4; 706/55; 715/256, 715/745; 700/246; 726/19
See application file for complete search history.

(56) References Cited

U.S. PATENT DOCUMENTS 7,181,693 B1 *    2/2007    Anderson ............... G06F 3/011
    715/745
8,463,595 B1 *    6/2013    Rehling .................. G06F 40/30
    704/9

(Continued)

FOREIGN PATENT DOCUMENTS

WO    2009022124 A1    2/2009
WO    2012094725 A1    7/2012

OTHER PUBLICATIONS

Claire Theobald, "Edmonton teens develop app designed to help curb cyberbullying", https://edmontonsun.com/2016/10/08/edmonton-teens-develop-app-designed-to-help-curb-cyberbullying/wcm/90d8a3ad-e518-4d4e-b30e-e1420b65e9d7, Edmonton Sun, Oct. 8, 2016 (4 pages).

(Continued)

*Primary Examiner* — Gerald Gauthier
(74) *Attorney, Agent, or Firm* — Cantor Colburn LLP; Teddi Maranzano

(57) ABSTRACT

A communication device, computer program product and method of monitoring text at a communication device. The communication device includes an input device and a processor. The input device receives a text input from a user of the communication device. The processor operates a cognitive engine that determines a sentiment of the text, and displays a visual indicator based on the determined sentiment.

14 Claims, 2 Drawing Sheets

(56) References Cited

U.S. PATENT DOCUMENTS

| | | | | |
|---|---|---|---|---|
| 9,043,196 | B1* | 5/2015 | Leydon | G06F 3/04842 |
| | | | | 704/4 |
| 9,104,271 | B1* | 8/2015 | Adams | G06F 3/014 |
| 9,336,192 | B1* | 5/2016 | Barba | G06F 40/30 |
| 10,474,724 | B1* | 11/2019 | Prayaga | G06F 16/335 |
| 2006/0069589 | A1* | 3/2006 | Nigam | G06F 40/253 |
| | | | | 706/55 |
| 2009/0125806 | A1* | 5/2009 | Chiu | G06F 16/58 |
| | | | | 715/256 |
| 2014/0172415 | A1* | 6/2014 | Jo | G06F 40/30 |
| | | | | 704/9 |
| 2014/0188459 | A1* | 7/2014 | Fink | G06F 40/30 |
| | | | | 704/9 |
| 2015/0281917 | A1* | 10/2015 | Weiss | H04M 1/72552 |
| | | | | 455/419 |
| 2016/0232244 | A1* | 8/2016 | Liu | G06F 3/011 |
| 2016/0259548 | A1 | 9/2016 | Ma | |
| 2016/0294755 | A1* | 10/2016 | Prabhu | H04L 51/046 |
| 2016/0342683 | A1 | 11/2016 | Lim et al. | |
| 2016/0378965 | A1* | 12/2016 | Choe | G06F 3/011 |
| | | | | 726/19 |
| 2017/0017998 | A1* | 1/2017 | Dhawan | G06K 9/00302 |
| 2017/0083599 | A1* | 3/2017 | Bostick | G06F 16/955 |
| 2017/0147202 | A1* | 5/2017 | Donohue | G06F 3/04886 |
| 2017/0262431 | A1* | 9/2017 | Alam | G06Q 10/00 |
| 2018/0018581 | A1* | 1/2018 | Cook | H04L 67/10 |
| 2018/0232678 | A1* | 8/2018 | Chirayil | G10L 15/22 |
| 2019/0155906 | A1* | 5/2019 | Mehrotra | G06F 3/0484 |
| 2019/0228357 | A1* | 7/2019 | Fisher | G06N 7/005 |
| 2019/0297042 | A1* | 9/2019 | Prabhu | G06F 3/04817 |
| 2020/0159829 | A1* | 5/2020 | Zhao | G06T 11/206 |
| 2020/0201939 | A1* | 6/2020 | Doherty | G06F 40/30 |

OTHER PUBLICATIONS

James Vincent, "Apple is reportedly putting a dynamic E Ink keyboard in 2018 MacBooks", https://www.theverge.com/2016/10/19/13328710/apple-e-ink-keyboard-macbook-sonder-rumors, The Verge, Oct. 19, 2016 (3 pages).

Website URL:<https://sonderdesign.com> Retrieved on Dec. 17, 2018 (8 pages).

The Acrolinx Team, "Market Challenges Call for a New Solution: Introducing Acrolinx Cloud Edition", https://www.acrolinx.com/blog/market-challenges-call-for-a-new-solution-introducing-acrolinx-cloud-edition, Acrolinx, Mar. 31, 2015 (3 pages).

* cited by examiner

VISUALIZING SENTIMENT ON AN INPUT DEVICE

BACKGROUND

The present invention relates to electronic text communication, and more specifically, to a system and method for providing feedback to a user entering text into a communication device in order to indicate of a sentiment being expressed by the user.

Electronic text communication such as emails, text messages, etc., provides a medium of communication in which a person's tone and expression are often misinterpreted. A word that is expressed in one way during an in-person conversation using a tone of voice, facial expression, and other body language, can be interpreted differently when these conversational indicators are removed, such as in electronic text communication. Therefore, there is the chance that a user can unintentionally send a message that is interpreted as being rude or aggressive when no such offense is intended. There is a need to alert the user to the offensive language being entered into a communication device prior to the user sending a message.

SUMMARY

Embodiments of the present invention are directed to a method of monitoring text at a communication device. The method includes receiving, at the communication device, a text input from a user, determining a sentiment of the text using a cognitive engine operating at a processor of the communication device; and displaying a visual signal indicative of a sentiment expressed by the text to the user.

Embodiments of the present invention are directed to a communication device. The communication device includes an input device and a processor. The input device receives a text input from a user of the communication device. The processor operates a cognitive engine that determines a sentiment of the text, and displays a visual indicator based on the determined sentiment.

Embodiments of the present invention are directed to a computer program product for monitoring text at a communication device, the computer program product comprising a computer readable storage medium having program instructions embodied therewith. The program instructions are executable by a processor to cause the processor to perform: receiving, at the communication device, a text input from a user, determining a sentiment of the text using a cognitive engine operating at a processor of the communication device, and displaying a visual signal indicative of a sentiment expressed by the text to the user.

DETAILED DESCRIPTION

Figure 1:
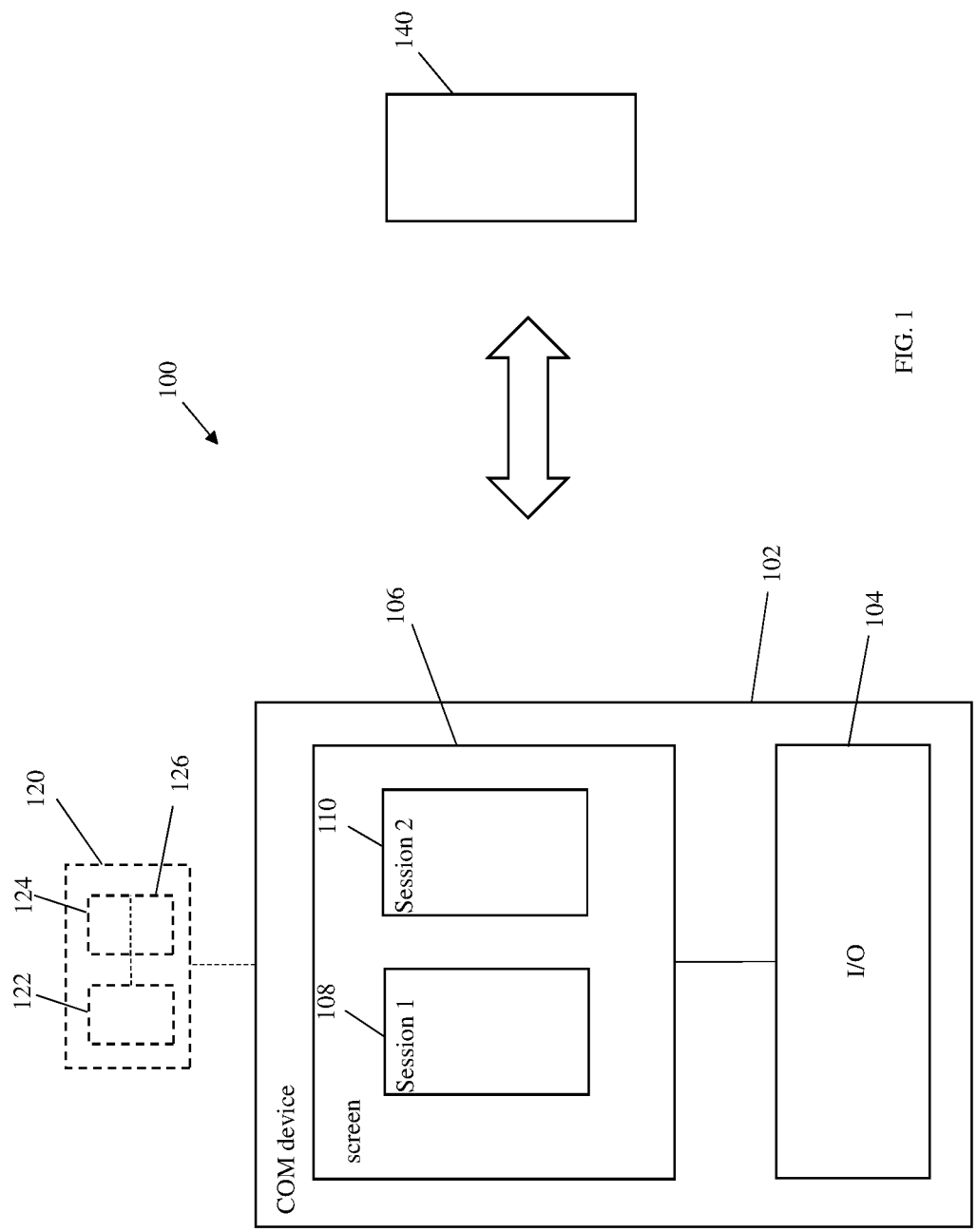
FIG. 1 shows a communication system including a first communication device and a second communication device.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Neural Networks are connected computing systems modeled after the neurons in the human brain. Multiple computational layers process an input, with each layer applying more and more complex processing. A trained neural network determines an output response for an input signal.

Machine Learning gives computers the ability to "learn" without being explicitly programmed. Machine learning explores the study and construction of algorithms that can learn from and make predictions on data. Such algorithms overcome following strictly static program instructions by making data-driven predictions or decisions, through building a model from sample inputs. Machine Learning can be supervised, unsupervised or reinforced. In supervised learning, a computer is presented with example inputs and their desired outputs, given by a "teacher," with the goal of learning a general rule that maps inputs to outputs. In unsupervised learning, no labels are given to the learning algorithm, leaving it on its own to find structure in its input.

Unsupervised learning can be a goal in itself (such as discovering hidden patterns in data) or a means towards an end (such as feature learning). In reinforcement learning, a computer program interacts with a dynamic environment in which it must perform a certain goal (such as driving a vehicle or playing a game against an opponent). The program is provided feedback in terms of rewards and punishments as it navigates its problem space.

FIG. 1 shows a communication system 100 including a first communication device 102 and a second communication device 140. A first user at the first communication device 102 communicates with a second user at the second device 140 by typing text into the first communication device 102 and entering a 'send' command. The text entered by the first user is then displayed at the second communication device 140 to be read by the second user. In various embodiments, at least one of the first communication device 102 and the second communication device 140 can be a mobile device, such as a smartphone, a tablet device or other electronic communication device.

Referring to the first communication device 102 for illustrative purposes, the first communication device 102 includes an input device 104 by which a user can type or enter text and a screen 106 which displays the text. In various embodiments, the input device 104 can be an integrated component of the first communication device 102 or a separate component in communication with the first communication device 102. The input device 104 can be an interactive application that appears on the screen 106 as a touch-sensitive region of the screen 106 for receiving input from the user.

The first communication device 102 further includes a control unit 120 including a processor 122 and a memory storage device 124 storing various programs and instructions 126. The instructions 126, when accessed by the processor 122, enable the processor 122 to perform the various methods disclosed herein for control and operation of the first communication device 102.

In operating the first communication device 102, a first user can open one or more windows or sessions within the screen 106. A first session 108 and a second session 110 are shown for illustrative purposes. A window or session can be opened or closed based on user input. Upon opening a session, such as first session 108, the first user inputs a text or conversation using the input device 104. The user can shift a focus from one session to another session by entering a suitable command, or by touching the screen 106 at a location of the selected session, for example. In various embodiments, the input device 104 can appear at the screen 106 when a session has focus and can disappear from the screen 106 when no sessions have focus.

Once the user has selected a session, the user enters a text into the session using the input device 104. The first communication device 102 reads or interprets the text as it is being input by the user, interprets a sentiment being expressed by the user and provides a visual indicator as feedback to the user. In various embodiments, the visual indicator is in the form of a color displayed on the input device 104. The input device 104 can change from a neutral color (i.e., white) to a color more expressive of the sentiment of the text (i.e., red or blue). Additional colors can be used to indicate different sentiments. Thus the user, whose attention is generally directed at the input device 104 when typing, becomes immediately notified of the sentiment being expressed. When two or more sessions are open in the screen 106 such as first session 108 and second session 110, the visual indicator being displayed can change based on which session has focus or has been selected by the user.

The type of color is indicative of the sentiment being expressed. The intensity of the color can change as the sentiment changes. Additionally, a user can erase or revise what has been entered into the session and enter a revised statement, whereas the color and intensity of the visual indicator changes to reflect the sentiment expressed in the revised statement. The visual indicator is provided to the first user to allow the user to be aware of the sentiment being expressed before the first user sends the message, thereby preventing offense or misunderstanding by the second user of the second communication device 140.

Figure 2:
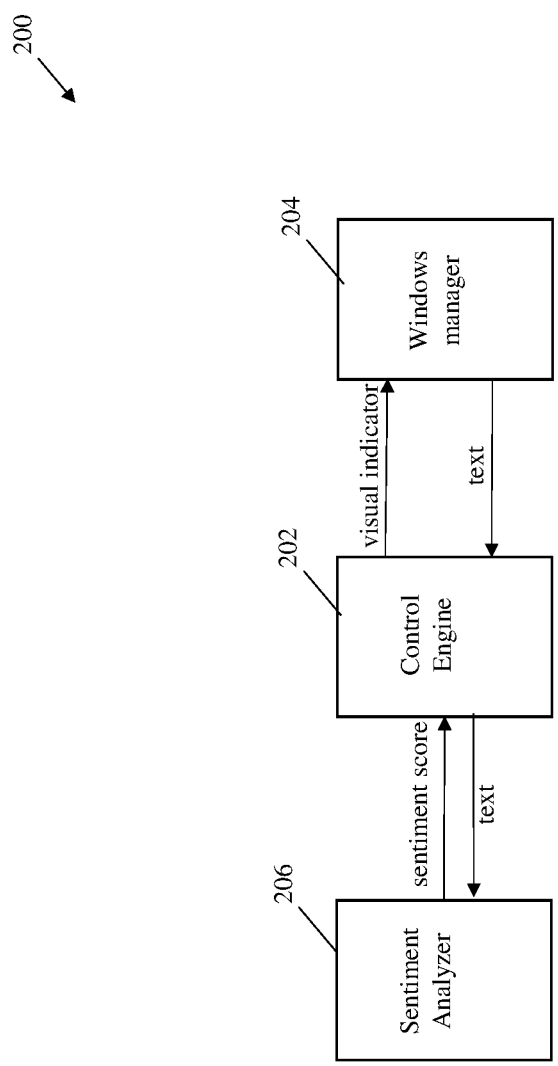
FIG. 2 shows a schematic diagram of an operating system of the first communication device.

FIG. 2 shows a schematic diagram of an operating system 200 of the first communication device 102. The operating system includes, in part, a windows manager 204 and a control engine 202, which are run on processor 122, FIG. 1. The windows manager 204 controls operation of the sessions, opening and closing sessions, allowing data input, etc. The control engine 202 reads the text input at the windows manager 204 and provides the text to a sentiment analyzer 206 that can be a service of IBM Watson® via an application programming interface (API). The sentiment analyzer 206 calculates a numerical sentiment score for the text and provides the sentiment score to the control engine 202. The control engine 202 indicates a visual indicator based on the sentiment score to the windows manager 204. The windows manager 204 then display the visual indicator corresponding to the sentiment score to the user as discussed herein. The control engine 202 can request the text from the windows manager 204 and provide the text to the sentiment analyzer 206 on a periodic basis or at a selected interval. The sentiment analyzer 206 therefore calculates the sentiment score for the text provided during the selected interval, providing this updated sentiment score to the control engine 202 which provides a corresponding visual indicator to the windows manager 204. The control engine 202, therefore, can provide a visual indicator that is substantially aligned with the text currently displayed at a selected session. When requested by the control engine 202, the windows manager 204 provides text to the cognitive engine 202 from a session that currently has focus.

The sentiment score can also be provided as metadata to a session of the windows manager 204. When the session is saved, the windows manager 204 saves the sentiment score as part of a template for the session. When the session is reopened, the stored sentiment score is accessed and used to provide the visual indicator.

Additional processes also can be included, and it should be understood that the processes depicted herein represent illustrations and that other processes can be added or existing processes can be removed, modified, or rearranged without departing from the scope and spirit of one or more embodiments of the present invention.

The present techniques can be implemented as a system, a method, and/or a computer program product. The computer program product can include a computer readable storage medium (or media) having computer readable program instructions thereon for causing a processor to carry out aspects of one or more embodiments of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of one or more embodiments of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments of the present invention.

Aspects of one or more embodiments of the present invention are described herein with reference to flowchart illustrations and/or block diagrams of methods, apparatus (systems), and computer program products according to one or more embodiments of the present invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of one or more embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A method of monitoring text at a communication device, comprising:

receiving, via an input device of the communication device, a text input from a user, wherein the input device is a keyboard disposed on a touch-sensitive region of a screen the communication device for receiving input from the user;

determining a sentiment of the text using a cognitive engine operating at a processor of the communication device; and displaying a visual signal indicative of a sentiment expressed by the text to the user, wherein the visual signal further comprises at least one of: (i) changing a color of the input device to be the color associated with the sentiment; and (ii) changing an intensity of the color based on a degree of the sentiment.

2. The method of claim 1, further comprising determining a new sentiment at the cognitive engine upon receiving a revision of the text prior to sending the text.

3. The method of claim 1, wherein the determining the sentiment further comprises calculating a numerical sentiment score for the text.

4. The method of claim 3, further comprising storing the numerical sentiment score upon closure of a session for text input.

5. The method of claim 1, wherein a first session of the communication device includes text expressing a first sentiment and a second session of the communication device includes text expressing a second sentiment, the method further comprising providing the visual signal based on which of the first session and second session has focus.

6. A communication device, comprising:
an input device configured to receiving a text input from a user of the communication device, wherein the input device is a keyboard disposed on a touch-sensitive region of a screen the communication device for receiving input from the user;
a processor configured to:
operate a cognitive engine that determines a sentiment of the text; and
display a visual indicator based on the determined sentiment, wherein the visual signal further comprises at least one of: (i) changing a color of the input device to be the color associated with the sentiment; and (ii) changing an intensity of the color based on a degree of the sentiment.

7. The communication device of claim 6, further comprising wherein the cognitive engine is configured to determine a new sentiment upon receiving a revision of the text to express the new sentiment.

8. The communication device of claim 6, wherein the cognitive engine is further configured to calculate a numerical sentiment score for the text.

9. The communication device of claim 8, wherein the processor is further configured to store the numerical sentiment score upon closure of a session.

10. The communication device of claim 6, wherein a first session at a screen of the communication device includes text expressing a first sentiment and a second session at the screen of the communication device includes text expressing a second sentiment, wherein the processor is further configured to provide the visual indicator based on which of the first session and second session has focus.

11. A computer program product for monitoring text at a communication device, the computer program product comprising a computer readable storage medium having program instructions embodied therewith, the program instructions executable by a processor to cause the processor to perform:
receiving, by an input device of the communication device, a text input from a user, wherein the input device is a keyboard disposed on a touch-sensitive region of a screen the communication device for receiving input from the user;
determining a sentiment of the text using a cognitive engine operating at a processor of the communication device; and
displaying a visual signal indicative of a sentiment expressed by the text to the user, wherein the visual signal further comprises at least one of: (i) changing a color of the input device to be the color associated with the sentiment; and (ii) changing an intensity of the color based on a degree of the sentiment.

12. The computer program product of claim 11, further comprising determining a new sentiment at the cognitive engine upon receiving a revision of the text prior to sending the text.

13. The computer program product of claim 11, wherein the determining the sentiment further comprises calculating a numerical sentiment score for the text.

14. The computer program product of claim 13 further comprising storing the numerical sentiment score upon closure of a session for text input.

* * * * *